United States Patent [19]

Mikhlin, deceased et al.

[11] Patent Number: 4,889,538

[45] Date of Patent: Dec. 26, 1989

[54] COAL AGGLOMERATION BENEFICIATION WITH HEAVY HYDROCARBON OILS AND UTILIZATION THEREOF IN COAL/HEAVY OIL COPROCESSING

[75] Inventors: Josef A. Mikhlin, deceased, late of Montreal, Canada, by Fira Mikhlin, legal representative; Michio Ikura, Kanata, Canada; James F. Kelly, Nepean, Canada; C. Edward Capes, Ottawa, Canada

[73] Assignee: Minister of Energy, Mines and Resources Canada, Canada

[21] Appl. No.: 219,444

[22] Filed: Jul. 14, 1988

[51] Int. Cl.$^4$ .................................. C10L 5/00
[52] U.S. Cl. ........................... 44/90; 44/24; 44/627; 44/905; 209/171
[58] Field of Search ............... 44/90, 905, 24, 20, 44/627; 209/171, 173

[56] References Cited

U.S. PATENT DOCUMENTS

| | | | |
|---|---|---|---|
| 2,346,151 | 4/1944 | Burk et al. | 44/90 |
| 3,268,071 | 8/1966 | Puddington et al. | 209/5 |
| 3,365,066 | 1/1968 | Howell | 210/374 |
| 3,775,090 | 11/1973 | Messer et al. | 44/90 |
| 4,261,699 | 4/1981 | Sun et al. | 44/90 |
| 4,309,192 | 1/1982 | Kubo et al. | 44/90 |
| 4,583,990 | 4/1986 | McGarry et al. | 44/905 |
| 4,601,729 | 7/1986 | Capes et al. | 44/90 |

*Primary Examiner*—Carl F. Dees
*Attorney, Agent, or Firm*—Fisher, Christen & Sabol

[57] ABSTRACT

An improved process is described for agglomeration beneficiation of ground coal in which undiluted heavy oil or bitumen is used as the agglomerating vehicle. The ground cell, water and heavy oil or bitumen are mixed at an elevated temperature sufficient to lower the viscosity of the heavy oil or bitumen to a level permitting easy mixing and at an elevated pressure sufficiently high to prevent boiling of the water. This mixing causes agglomeration of the carbonaceous solids with the heavy oil or bitumen and the agglomerates obtained are separated from the tailings containing aqueous medium, and inorganic solids. The separated agglomerates are preferably used with additional heavy oil or bitumen to form a slurry feedstock for a coprocessing unit. This provides a very efficient total process since the coal agglomeration beneficiation uses a portion of the same heavy oil or bitumen feedstock which is used for coprocessing and no additional hydrocarbon diluent is required.

7 Claims, 1 Drawing Sheet

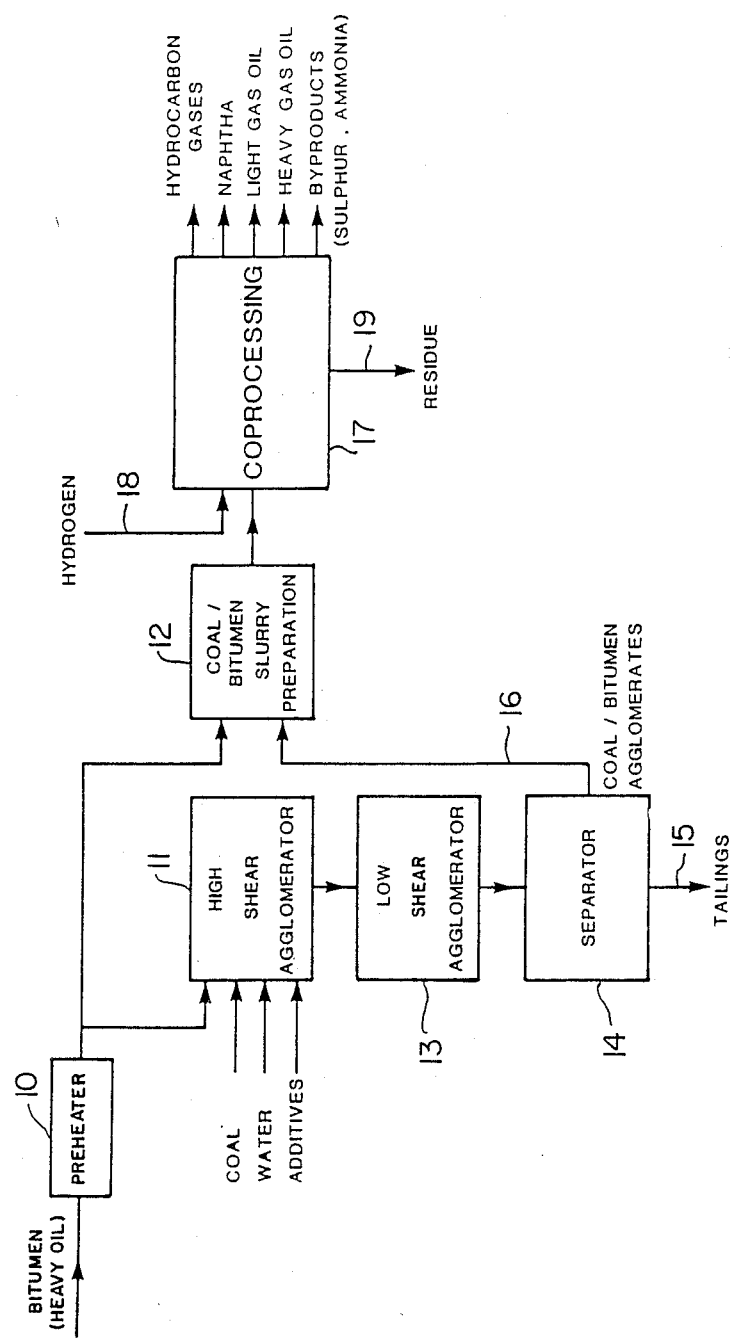

COAL AGGLOMERATION BENEFICIATION WITH HEAVY HYDROCARBON OILS AND UTILIZATION THEREOF IN COAL/HEAVY OIL COPROCESSING

BACKGROUND OF THE INVENTION

This invention relates to a process for oil agglomeration beneficiation of ground coal using a heavy oil or bitumen as an agglomerating vehicle and to a coal/heavy oil coprocessing in which the agglomerated coal forms part of the feedstock.

In many industrial applications of coal, e.g. fluidized or pulverized coal combustion, gasification, liquefaction, pyrolysis, coal-liquid mixtures, etc., fine grinding of coal is required. The ground coal mixture contains carbonaceous solids and inorganic solids and it is desirable to be able to separate the carbonaceous solids from the inorganic solids.

Also in coal mining processes the finely divided carbonaceous solids are produced as by-product and unless a suitable method is available for the use of such materials as fuel or the like, the finely divided carbonaceous solids constitute a waste.

The finely divided carbonaceous solids may be produced in dry form, or they may be in the form of aqueous slurries. For example, in coal mining operations, finely divided coal is produced as a by-product which is normally not completely recovered in coal cleaning operations.

In order to utilize finely ground coal as a feedstock for processes such as coal/oil coprocessing, there has been a need for improved methods of agglomerating the ground carbonaceous solids. It has long been known that mixing oils with aqueous slurries containing finely divided carbonaceous solids and finely divided inorganic solids results in selective agglomeration of carbonaceous solids. Many variations of these processes are known and two examples are those shown in Capes, et al. U.S. Pat. No 3,365,066 and Puddington, et al. U.S. Pat. No. 3,268,071.

It is known that the selective wetting of carbonaceous solids by oil and formation of the agglomerate in an aqueous slurry containing finely divided carbonaceous solids and inorganic solids is based on the difference between surface properties of the carbonaceous solids and inorganic solids. While carbonaceous solids are usually hydrophobic and oleophilic, the inorganic solids are hydrophilic. It has been found that cleaning of low rank coals such as sub-bituminous, lignites and the like as well as oxidized (weathered) higher rank bituminous coals do not result in the production of agglomerates of finely divided carbonaceous solids and oil when mixed with quantities of oil sufficient to agglomerate the carbonaceous solids contained in aqueous slurries mostly due to the lower hydrophobicity as compared to non-oxidized higher rank bituminous coals. Decrease in rank from bituminous to sub-bituminous and further to lignite is usually associated with gradually less hydrophobic balance of the coal surface properties. It is known that low rank or oxidized coal can be agglomerated with oil if a concentrated electrolyte such as concentrated sulphuric acid, concentrated hydrochloric acid or sulphur trioxide gas is mixed with the aqueous slurry.

It is an object of the present invention to provide an improved technique for producing coal/oil agglomerates which may be used in coal/oil coprocessing.

SUMMARY OF THE INVENTION

According to the present invention it has surprisingly been discovered that it is possible to utilize an undiluted heavy oil or bitumen as the agglomerating vehicle for the agglomeration beneficiation of ground coal. Thus, the heavy oil or bitumen is mixed with coal fines and water to form agglomerates of the coal fines, the mixing being carried out at an elevated temperature sufficient to lower the viscosity of the heavy oil or bitumen to a level permitting easy mixing and at an elevated pressure sufficient to prevent boiling of the water.

The undiluted heavy oil or bitumen is a pitch-like petroleum oil residue containing at least 50% by weight of material which boils above 525° C. It is industrially highly desirable to be able to coprocess this heavy oil or bitumen with coal and the present invention provides the special advantage of being able to use the same heavy oil or bitumen both for agglomeration beneficiation of the coal fines and as part of the feedstock for a process in which heavy oil or bitumen is coprocessed with coal.

The agglomeration is typically carried out at a temperature in the range of about 120 to 200° C. and a pressure of about 45 to 150 psig. For effective agglomeration beneficiation, the heavy oil or bitumen is preferably present in an amount of about 5 to 60 wt.% based on dry coal and water is preferably present in an amount to form a slurry containing about 5–50 wt.% solids. The coal particles typically contain about 5 to 60 wt.% ash (mineral matter) on a dry coal basis and are ground sufficiently finely to release the required amount of impurities, typically to −20 mesh (U.S. Sieve).

The term "coal" is used herein to designate a normally solid carbonaceous material including all ranks of coal, such as anthracite coal, lignite, peat and mixtures thereof. If the coal is a low rank or oxidized coal, it is preferably first mixed with an organic or inorganic electrolyte to increase the affinity of the carbonaceous solids to the heavy oil or bitumen. Among suitable electrolytes for this purpose, there may be mentioned hydrochloric acid, sulphuric acid, oxalic acid, acetic acid, sulphur dioxide gas and chlorine gas. When the electrolyte is used, it is typically present in an amount of 0.5 to 10 wt.% based on dry coal.

If the agglomerated material requires greater integrity, an organic or inorganic additive may be included in the mixture. Examples of such additives include oleic acid, cresylic acid, creosote oil, pine oil, di-n-propyl ketone, 1-hexanol, sodium oleate, naphthenic acid, naphthylacetic acid, Cynamid 825, etc. These additives are preferably present in an amount of about 0.5 to 5 wt.% based on dry coal and act as a surface conditioning agent to help the hydrocarbon bridging liquid.

Preheated bitumen or heavy oil, ground coal, water and any additives are preferably mixed in a high shear mixer where a high rate of agitation occurs. The resulting slurry containing microagglomerates of carbonaceous solids with reduced ash or mineral matter content is then passed from the high shear vessel to a low shear vessel having a lower rate of agitation. The agglomeration is continued in the low shear mixer and the resulting slurry is transferred to a separator where the agglomerated particles consisting of coal and bitumen or heavy oil is separated from the tailings containing the aqueous medium and inorganic solids. The separation may be done by screening, flotation, etc.

The coal/bitumen or heavy oil agglomerates obtained are then mixed with further of the bitumen or heavy oil to form a coal/bitumen or heavy oil slurry feedstock for a coprocessing unit.

The coprocessing is usually carried out in the presence of a hydrogenation catalyst. Such catalysts are well known to those skilled in the art and are usually compounds of metals in the form of oxides or sulfides. They may, for example, comprise compounds of cobalt, molybdenum, iron, tin, nickel, and mixtures thereof. According to a particularly preferred feature of this invention, the hydrogenation catalyst may be included as a component of the agglomerated particles. For instance, the catalyst in water-soluble form may be included as part of the additives to the high shear mixer. The catalyst incorporated within the agglomerated particles is particularly advantageous during coprocessing because it means that the catalyst is in close proximity to the coal particles.

The coprocessing can be conducted in a system such as that described in Canadian Pat. No. 1,117,886 and is typically carried out by passing the slurry feedstock through a confined hydrocracking zone maintained at a temperature above 400° C., a pressure of at least 1.4 MPa and a space velocity between about 0.5 and 4 volumes of hydrocarbon oil per hour per volume of reaction zone capacity. The reaction may be conveniently carried out as an up-flow in an empty tubular reactor with a mixed effluent being collected at the top containing a gaseous phase comprising hydrogen and vaporous hydrocarbons and a liquid phase comprising heavy hydrocarbons. This mixed effluent may be separated into a gaseous stream which can be fed to a low temperature-high pressure separator where it is separated into a gaseous stream containing hydrogen and lesser amounts of gaseous hydrocarbons and a liquid product stream which may include naphtha, light gas oil, heavy gas oil, etc. By-products such as sulphur and ammonia may also be obtained. It is also possible to have the coprocessing reactors in stages where the first reactor is an empty tubular reactor and the second reactor contains an ebullated bed of catalyst extrudates.

The coprocessing also produces a residue which includes unreacted coal and mineral solids. In addition to the solids, the residue may also contain a certain amount of light liquid hydrocarbons to assist in the transportation of solids. Since decreased solids in the residue results in a lower light liquid hydrocarbon requirement, the reduction of mineral matter in the coal feed by the oil agglomeration beneficiation increases the net liquid product yields from coprocessing and therefore the overall process efficiency.

For a better understanding of the invention, reference is made to the accompanying drawing which illustrates diagrammatically a preferred embodiment of the present invention.

As shown in the drawing, bitumen or heavy oil is heated in a preheater 10 and the heated oil is divided into one stream being fed to a high shear agglomerator 11 and a second stream being fed to a coal/bitumen slurry preparation vessel 12. The ground coal, water and any additives are also added to the high shear agglomerator 11. Some agglomeration occurs in vessel 11 and a mixture from the vessel 11 is transferred into a low shear agglomerator 13 which operates at a lower rate of agitation. The agglomeration continues in vessel 13 with the build-up of larger agglomerated particles. The mixture from vessel 13 is transferred to a separator 14 where the agglomerated particles of coal/bitumen is separated from a tailings comprising the water and mineral matter or ash.

The coal/bitumen agglomerates separated in separator 14 are transferred via line 16 to the coal/bitumen slurry preparation vessel 12. Here the agglomerates are mixed with the additional heated bitumen or heavy oil to provide a feedstock to the coprocessing unit 17. Also added to the coprocessing vessel 17 is hydrogen 18. From the coprocessing there is obtained a heavy pitch residue 19 and a series of distillation products.

The following specific examples illustrate the operation of the process of the invention.

EXAMPLE 1

Agglomeration beneficiation tests were conducted using two different low rank coals, namely Onakawana and Coronach lignites. The properties of the coals are given below:

| Proximate analysis (wt. %) (Moisture free) | Onakawana | Coronach |
|---|---|---|
| Ash | 19.7 | 18.63 |
| Volatile | 40.4 | 40.03 |
| Fixed Carbon | 39.9 | 41.34 |
| Ultimate analysis (wt. %) | | |
| Carbon | 55.0 | 56.19 |
| Hydrogen | 3.9 | 3.75 |
| Sulphur | 1.1 | 0.81 |
| Nitrogen | 0.6 | 0.71 |
| Ash | 19.5 | 18.63 |
| Oxygen | 19.9 | 19.91 |
| Ash analysis (wt. %) | | |
| $SiO_2$ | 40.32 | 39.61 |
| $Al_2O_3$ | 12.46 | 29.56 |
| $TiO_2$ | 1.09 | 0.81 |
| $Fe_2O_3$ | 11.20 | 4.51 |
| CaO | 15.60 | 13.64 |
| MgO | 3.91 | 4.35 |
| $K_2O$ | 0.62 | 1.25 |
| $Na_2O$ | 1.71 | 0.84 |
| $P_2O_5$ | 0.33 | 0.41 |
| $SO_3$ | 12.25 | 9.46 |
| BaO | — | 0.48 |
| SrO | — | 0.18 |
| Undetermined | 0.51 | 2.29 |

The above coals were agglomerated using Interprovincial Pipeline (IPPL) vacuum bottoms, which is a product obtained from conventional crude oil, and Cold Lake vacuum bottoms which is obtained from a synthetic crude oil. The vacuum bottoms used had the following properties:

| | IPPL | Cold Lake |
|---|---|---|
| 525° C.− | 0 wt. % | 16.9 wt. % |
| 525° C.+ | 100 | 83.1 |
| Aromaticity | 30 | 34.5 |
| Toluene insolubles | 0.92 wt. % | 0.03 wt. % |
| Viscosity (centistokes) | | |
| at 80° C. | — | 18400 |
| at 100° C. | 906 | 3381 |
| at 110° C. | 514 | — |
| at 130° C. | 184 | — |
| at 150° C. | — | 191 |
| Elemental analysis (wt. %) | | |
| Carbon | 86.4 | 82.8 |
| Hydrogen | 10.9 | 9.89 |
| Nitrogen | 0.43 | 0.68 |

-continued

|  | IPPL | Cold Lake |
|---|---|---|
| Sulphur | 1.71 | 5.83 |
| Oxygen | 0.56 | 0.80 |

(a) The Onakawana lignite having particle sizes of −65 mesh (U.S. Sieve) was mixed with the IPPL vacuum bottoms in the ratio of 42 g lignite particles, 420 g aqueous solution and 16 g IPPL vacuum bottoms. The mixing was carried out in a high speed propeller mixer vessel at a temperature of 150° C. and a pressure of 60 psig. The mixing was continued for 5 minutes to form microagglomerates of the lignite with the vacuum bottoms. The high speed mixing was followed by lower speed mixing at a temperature of 150° C. and a pressure of 60 psig to form larger agglomerates. This mixing was continued for 5 minutes, after which the content of the mixer was transferred to a separator where the agglomerates were separated from the tailings. The agglomeration beneficiation resulted in 95.8 wt.% combustible recovery and 68 wt.% ash rejection.

(b) The same procedure was repeated using the Coronach lignite and Cold Lake vacuum bottoms and this resulted in 96.1 wt.% combustibles recovery and 57.5 wt.% ash rejection.

EXAMPLE 2

Agglomeration beneficiation tests similar to those described in Example 1 were carried out on Onakawana lignites with IPPL vacuum bottoms agglomerating vehicle. The mixing was carried out at a temperature of 150° C. and a pressure of 60 psig, with sulphuric acid being used as electrolyte and cresylic acid being used as conditioning agent. Sufficient water was present to provide about 10 wt.% solids. Combustibles recovery and ash rejection were measured and the processing conditions and results are shown in the following table:

| | Processing Conditions | | | | Results | |
|---|---|---|---|---|---|---|
| Test No. | Ash in Coal wt. % | IPPL Bottoms wt. % | Electrolyte wt. % | Conditioning Agent wt. % | Combustibles Recovery wt. % | Ash Rejection wt. % |
| 1 | 32 | 36.4 | 7.7 | 2.09 | 95.5 | 42.2 |
| 2 | 32 | 39.8 | 7.13 | 1.75 | 99.8 | 54.1 |
| 3 | 35.3 | 38.4 | 7.4 | 1.86 | 96.7 | 54.4 |

Note: All wt. % values on dry coal basis.

What is claimed is:

1. A process for agglomerating coal fines which comprises mixing a pitch-like petroleum oil residue containing at least 50% by weight of a material which boils above 525° C. with an aqueous slurry of said coal fines to form agglomerates of said coal fines, the mixing being carried out at an elevated temperature sufficient to lower the viscosity of said pitch-like petroleum oil residue to a level permitting easy mixing and at an elevated pressure sufficiently high to prevent boiling of the water at the mixing temperature.

2. A process according to claim 1 wherein the agglomeration is carried out at a temperature in the range of 120 to 200° C. and a pressure in the range of 45 to 150 psig.

3. A process according to claim 2 wherein the coal is a low rank or oxidized coal.

4. A process according to claim 1 wherein a hydrogenation catalyst is incorporated in the agglomerates.

5. A process according to claim 4 wherein the catalyst is selected from compounds of cobalt, molybdenum, iron, tin, nickel and mixtures thereof.

6. A process according to claim 1 wherein the agglomerated product is separated from the remaining liquid containing ash or mineral matter.

7. A process according to claim 6 wherein the agglomerated product comprising coal and undiluted pitch-like petroleum oil residue is mixed with additional heavy oil or bitumen to form a feedstock which is then subjected to oil/coal coprocessing.

* * * * *